United States Patent [19]

Heeb et al.

[11] Patent Number: 4,591,900

[45] Date of Patent: May 27, 1986

[54] ENCODING PATTERN FOR SINGLE CHIP CCD CAMERA PROCESSING SCHEME

[75] Inventors: Egon J. Heeb; Karl H. Knop, both of Zurich; Rudolf H. Morf, Winterthur, all of Switzerland

[73] Assignee: RCA Corporation, Princeton, N.J.

[21] Appl. No.: 559,460

[22] Filed: Dec. 12, 1983

[30] Foreign Application Priority Data

Mar. 14, 1983 [GB] United Kingdom ............ 8306899
Sep. 14, 1983 [GB] United Kingdom ............ 8324684

[51] Int. Cl.⁴ ............................................. H04N 9/077
[52] U.S. Cl. ......................................... 358/44; 358/43
[58] Field of Search ................. 358/41, 44, 43, 48; 430/30

[56] References Cited

U.S. PATENT DOCUMENTS

| | | | |
|---|---|---|---|
| 3,921,206 | 11/1975 | Böhm et al. ............ | 358/44 |
| 3,982,274 | 9/1976 | Chai ...................... | 358/41 |
| 4,282,547 | 8/1981 | Morishita .............. | 358/44 |
| 4,288,812 | 9/1981 | Rhodes .................. | 358/44 |
| 4,345,270 | 8/1982 | Nagumo et al. ........ | 358/44 |
| 4,534,620 | 8/1985 | Gale et al. ............. | 350/166 |

FOREIGN PATENT DOCUMENTS

| | | |
|---|---|---|
| 0049594 | 4/1982 | European Pat. Off. . |
| 100859 | 6/1983 | Japan ................. 358/44 |
| 1357190 | 6/1974 | United Kingdom . |
| 2014397 | 8/1979 | United Kingdom . |
| 1575240 | 9/1980 | United Kingdom . |

OTHER PUBLICATIONS

Aoki et al., IEEE Transactions on Electron Devices, vol. ED-29, No. 4, Apr. 1982, pp. 745–750.

*Primary Examiner*—James J. Groody
*Assistant Examiner*—Randall S. Svihla
*Attorney, Agent, or Firm*—Eugene M. Whitacre; Jerald E. Roehling; Lawrence C. Edelman

[57] ABSTRACT

A color filter is provided for use with an imager which has a plurality of discrete collection sites. The filter has a plurality of color filter elements arranged in rows aligned with the collection sites. Two elements of the filter overlay a scan line of the imager in one television field, and each of the rows has a repeating sequence, e.g., 6, of at least two independent colors. The adjacent rows in the filter have their color sequences shifted by two elements. A demultiplexing scheme is disclosed, which features a high-frequency luminance signal having a constant colorimetric composition.

31 Claims, 18 Drawing Figures

ENCODING PATTERN FOR SINGLE CHIP CCD CAMERA PROCESSING SCHEME

The present invention relates to television cameras and, more particularly, to color filters for single chip solid-state television cameras and signal processing of the video signal derived from such cameras.

BACKGROUND OF THE INVENTION

The availability of solid-state image sensors, such as MOS or CCD devices, has renewed the interest in color encoding schemes for cameras having only one image sensor to sense images having a plurality of colors. The inherent geometrical stability of the solid-state sensor allows schemes which practically would be impossible to realize with a pick-up tube, such as a vidicon or saticon. Many color encoding filters have been developed, however, in general these prior art filters have resolution and crosstalk problems which make them unsuitable for use in some high quality, single chip solid-state camera system.

In a frame-transfer CCD (also known as a field-transfer CCD), the whole imaging area is photosensitive. The individual pixels are defined horizontally by vertical channel stops and vertically by horizontal gates having 2, 3 or 4 phase signals applied thereto. As a result of the method of defining the pixels vertically, interlace of the even and odd fields, which cover separate areas in the image for a normal TV signal, is achieved by vertical overlap of pixels in alternate fields. FIG. 1 illustrates a portion of a frame transfer imager 10 with the dotted horizontal lines showing vertical scan boundaries for even fields and the solid horizontal lines showing vertical scan boundaries for odd fields. Scanning line numbers are shown to the left and right of imager 10. A pseudo-interlace is obtained by defining the pixel structure in the two fields with a vertical offset corresponding to one unit of vertical resolution. This mode of operation is equivalent to summing over two units of vertical resolution from adjacent lines where a pixel (picture element) is the combination of two units of vertical resolution in the vertical direction in each field. The vertical resolution limit is not affected by this, but contrast is reduced for vertical spatial frequencies near the Nyquist limit of the vertical sampling.

It should be noted that the present invention is applicable to solid-state devices other than frame-transfer CCDs, for example, to sensors which allow operation with non-overlapping sampling elements such as a MOS diode array sensor. The detailed discussion of the present invention will be devoted to the frame-transfer type device.

The overlapping interlace mode of a frame-transfer CCD which does not allow access to single units of vertical resolution represents a stringent boundary condition for the selection of useful color encoding patterns. For instance, a classical example of a color encoding pattern, the so-called Bayer-pattern, is shown in FIG. 2a, wherein R, G, B refer to red, green, and blue colors respectively, does not work for a frame-transfer CCD, since alternatively only 2 types of signal would be generated, R+G and B+G, and there would be no third type of signal such as G+G. For a full color signal three different signals are required as a minimum.

A whole class of color encoding patterns suited for a frame-transfer CCD are vertical stripe patterns, such as the Yellow-Green-Cyan (Ye, G, Cy) stripes shown in FIG. 2b giving a three color periodicity. The vertical stripe schemes, however, yield relatively poor horizontal resolution, since they require optical low pass filtering to remove aliasing, which removes any spatial frequencies at the stripe filter frequency. For a three pixel period as shown in FIG. 2, the theoretical resolution limit is ⅔ that of the b/w (monochrome) chip. In practice it is even lower, about 50% of b/w resolution.

Resolution can be improved by making use of the second dimension of the image plane for encoding. A class of encoding patterns which does this and still is compatible with a frame-transfer CCD is shown in U.S. Pat. No. 3,982,274 (see FIG. 2c). Here, every second line in the pattern is uniformly colored as indicated by "J" coloration of all pixels on the bottom TV lines of sets 1 and 3 of FIG. 2c, wherein K, L, and J are general colors. As a consequence, the two fields (even and odd) in the video signal have the same colorimetric composition. Lines with elements KJ/LJ and MJ/NJ are generated in both fields, the only difference being that J appears above or below the other element, which is irrelevant for producing the CCD signal. (It may cause flicker under certain circumstances.) A particular pattern of this type is shown in FIG. 2d, wherein w=white or clear. Full resolution in luminance in both directions can be achieved. For chrominance, however, a 1-H delay line is required for decoding and as a consequence, the cameras using such delay lines are rather sensitive to color beats in pictures of objects with certain horizontal line structures. Again, an optical diffuser (two dimensional) is required to help reduce these artifacts.

Referring to FIG. 2e another prior art checkerboard filter pattern for use with single chip solid-state color camera is shown. In this pattern described by Aoki, et al., in a journal article published in IEEE Transactions On Electron Devices, Vol. ED-29, No. 4, April 1982, pp. 745–50 a four color vertical periodicity is provided by a color filter having yellow, green, cyan and white filter elements. In adjacent rows the pattern is shifted by two elements in the horizontal direction such that a cyan element resides vertically between two yellow elements, a white element resides between two green elements, etc. This pattern may provide good performance for an XY-addressed MOS-photodiode sensor where a complete color signal can be derived for each line (without a 1-H delay line) while scanning two rows at a time. However, such a filter pattern is not useful with a device such as a frame-transfer CCD in which only two types of signal would be generated. In fact in the specific example given above the two signals are Ye+Cy and G+W which both yield R+2G+B and no chrominance signal could be generated in a frame transfer CCD using this filter pattern. As described above, with respect to the Bayer-pattern, three different signals are required to reproduce full color.

Another checkerboard filter is described in U.S. Pat. No. 4,288,812 issued on Sept. 8, 1981 in the name of R. N. Rhodes. In this patent the filter elements which overlay less than a pixel area of the imager are shifted from row to row. This filter structure is useful with a CCD frame-transfer device, however, it also requires a 1-h delay line for decoding.

It is, therefore, desirable to provide a checkerboard color filter for use with solid-state imagers, especially for use with single-chip, frame-transfer imagers, that provide the signals necessary to reproduce a color image and that do no require the complexity of a one-horizontal line time delay line. Further, it is desirable to provide signal processing for deriving a full color video signal from a single-chip, solid-state camera.

SUMMARY OF THE INVENTION

In accordance with the principles of the present invention a camera is provided that overcomes the problems of prior art cameras. The camera includes a solid-state imager having a plurality of collection sites for collecting unprocessed signals generated in response to radiant energy from a scene. A color filter is interposed between the scene and the solid-state imager having color filter elements arranged in rows, a pair of said rows of color filter elements being instantaneously aligned at any particular instant with a single row of the collection sites. Each row of said color filter elements comprises a repeating sequence of colors, adjacent rows being mutually shifted with respect to each other. Further the camera includes signal processing means, coupled to the imager, for generating a processed signal representative of the scene, including information related to the color content of the scene.

BRIEF DESCRIPTION OF THE DRAWING

FIG. 3 shows an embodiment of a color encoding filter in accordance with the present invention having generalized colors;

FIGS. 4a and 4b show a checkerboard color filter pattern in accordance with the present invention;

FIG. 7b is a diagram for use in describing the centering operation of the $C_3$ signal shown in FIG. 7a.

FIGS. 8 and 9 show waveform diagrams for use in describing the operation of the signal processing of FIG. 7a;

FIG. 12 shows another checkerboard color filter pattern in accordance with the principles of the present invention.

DETAILED DESCRIPTION

Figure 1:
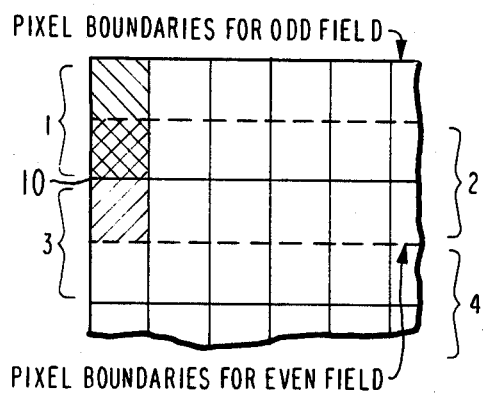
FIG. 1 shows a portion of a frame-transfer imager.
Figure 2E:
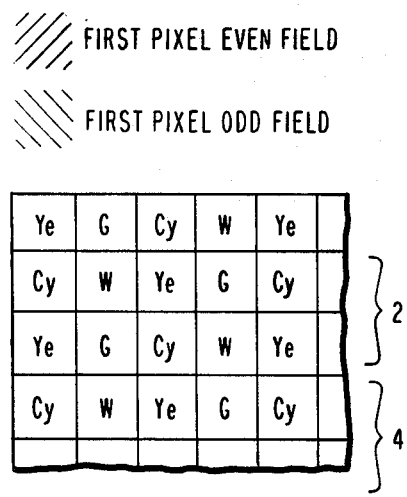
FIGS. 2a, b, c, d and e show prior art color encoding filters.
Figure 2A:
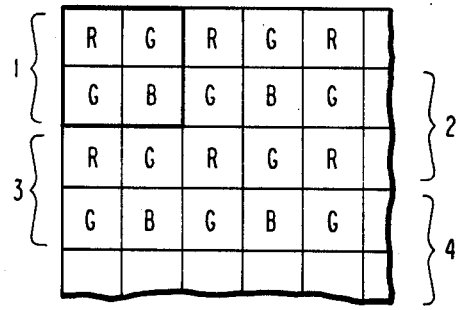
Figure 2B:
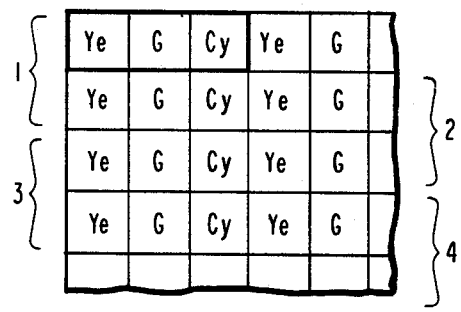
Figure 2C:
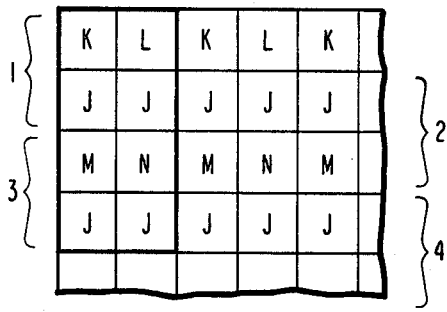
Figure 2D:
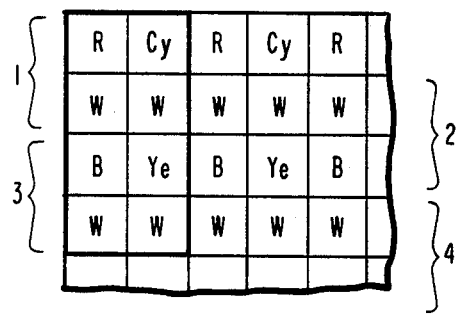
Figures 3, 4A, 4B, 12:
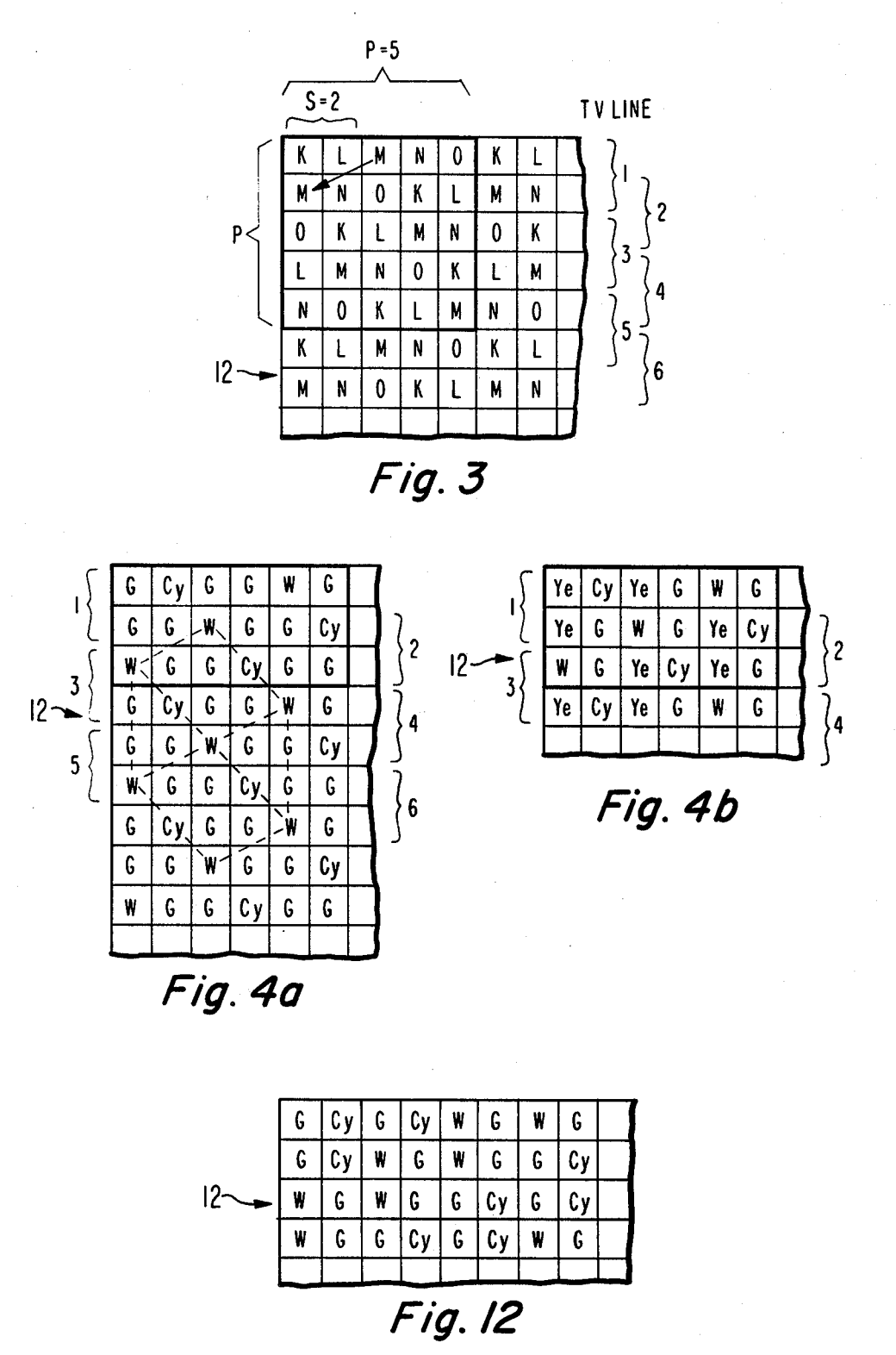

FIG. 3 shows how a filter 12 having a pattern in accordance with the invention ("SHIFT" pattern) is generated. The first line is defined by repeating a sequence of p colors, e.g., p=5 (K, L, M, N, O). The colors K–O need not be all different. A minimum of three different and independent colors are needed for full color definition in a single-chip color camera. For other applications, where separation into two spectrally different channels is provided, a minimum of two colors is sufficient. Each successive line is now obtained by repeating the previous line shifted to the left by a certain amount S, wherein $0 < S < p$, e.g., S=2 in FIG. 3 as indicated by the arrow linking color M in the first row with M in the second row. The pattern repeats vertically after p lines. It will repeat sooner, namely after p/S lines, if p/S is an integer. When used with a frame-transfer CCD, every line of the video signal will contain the same colorimetric sequence shifted in phase by S pixels, e.g., KM, LN, MO, NK, OL. Consequently, every line requires basically the same processing.

Every arbitrary choice of p, S and the sequence of colors may not result in a pattern that provides a preferred color camera system. In fact, for almost any pattern chosen there may be an image whose reproduction may be unrecognizable. For example, if spatial information in the image is similar in structure to the color encoding pattern, strong aliasing effects may result, such as color moirés and beats. In general, at least three independent color elements must be available in a combined two line color sequence, i.e., when the filter elements from two adjacent horizontal lines are combined at least three independent colors must be available from each scan. It should be noted, however, that in a two chip color camera a SHIFT pattern may be used where only two independent colors may be required, if for example, one imager provides one independent color the other imager provides two other independent colors. Independent color elements refer to the primaries-different and colorimetrically independent from each other, e.g., red; green and yellow would be a bad choice for three independent colors because yellow is the combination of red and green. In general, we have found that useful patterns are obtained for values of $p \geq 5$; $2 \leq S \leq p-2$ when the shift is such as to give the three independent colors. When S=0, 1 or p-1, a vertical or diagonal stripe pattern results for which particularly promising cases have not yet been found.

Certain specific SHIFT patterns have been found particularly useful for a frame-transfer CCD device. They will be described in detail below. It should be noted, however, that as the dimensions of the pixel of the device change, other SHIFT patterns may suit better and yield better performance.

Two specific SHIFT patterns, both with p=6 and S=2, are shown in FIGS. 4a and 4b respectively. The pattern repeats vertically every three lines forming a 3×6 color matrix. The pattern of FIG. 4a contains three colors—cyan (Cy), green (G), and white (W). Filters having these colors can be made relatively easily even in low quantities. The pattern of FIG. 4b contains a fourth color, yellow (Ye), which when the filter is made in large quantities represents no substantial additional cost. The filters of FIGS. 4a and 4b can be realized by superposition of a yellow and a cyan pattern, since green is the superposition of yellow and cyan. For an illustration of a technique for forming color filters in accordance with FIGS. 4a and 4b reference may be made to a copending U.S. patent application Ser. No. 512,541 filed on July 11, 1983, now U.S. Pat. No. 4,534,620, in the name of M. T. Gale et al. The relative ease with which these colors can be fabricated is not the dominant reason for their selection. A more important consideration is the average transmission of the filter, which for both cases approximates the chromatic composition for a luminance (Y) signal, i.e., $Y = 0.59G + 0.30R + 0.11B$. The given colors yield good performance; however, other selections are possible and under certain circumstances may perform even better.

If these patterns are used on a CCD imager without an optical diffuser strong color beats and artifacts result. It has been found that the use of a two dimensional diffuser whose characteristics correspond to an averaging over an area of 2 by 2 filter elements efficiently reduces these effects and provides satisfactory performance. Since the bandwidth of such a diffuser coincides with the Nyquist limit of the sampling by the CCD itself, luminance resolution is essentially unaffected.

It is difficult to explain why the FIG. 4 patterns perform well. One reason is certainly the more or less even distribution of the different colors over the surface which, to a large degree, avoids any build-up of stripes. For instance, in the pattern of FIG. 4a the red sensitive elements, W, reside at the vertices of a hexagonal pattern. This is shown for some white elements by dotted lines forming a hexagon in FIG. 4a. It will be noticed that a central white element is surrounded by six other white elements at about the same distance. The same is true for the other white elements, except for those near the edges.

The color encoding pattern forms the basis for good single-chip color cameras. The demultiplexing of the video signal generated, however, is equally important and substantial improvements in overall-performance of the camera can be achieved by carefully optimizing the electronic processing for a given pattern. It is difficult to describe a general analog processing scheme which would apply to any arbitrary SHIFT pattern. We can describe, however, a general processing scheme as it may be realized in digital form.

To describe the digital processing scheme the following quantities are introduced:

$S_i$: color multiplexed signal coming from pixel number i (two units of vertical resolution)

$c_k$ coefficients which describe (completely) the processing; k is a summation index over neighboring pixels on the same line, $-m \leq k \leq m$; j=1, 2, 3 describes the three color components (R, B, G or I, Q, Y), l=1, 2, ... p describes different phases in the processing.

Then the three processed signals $v^{ij}$ (j=1, 2, 3) which describe a color video picture are obtained by the following operation:

$$v^{ij} = \sum_{k=-m}^{m} c_k^{jl} S_{i+k}$$

where $$l = f(i),$$

and f(i) is a periodic function with period p and has values 1, 2, ... p which describe the particular place in the sequence of colors of the pattern which corresponds to pixel i. For instance, in the pattern of FIG. 4a, l=2 means that the center element $S_i$ in the sum is of the type CyG with a GG neighbor to its left, l=3 means GW with a GG neighbor to its right.

Figure 5:
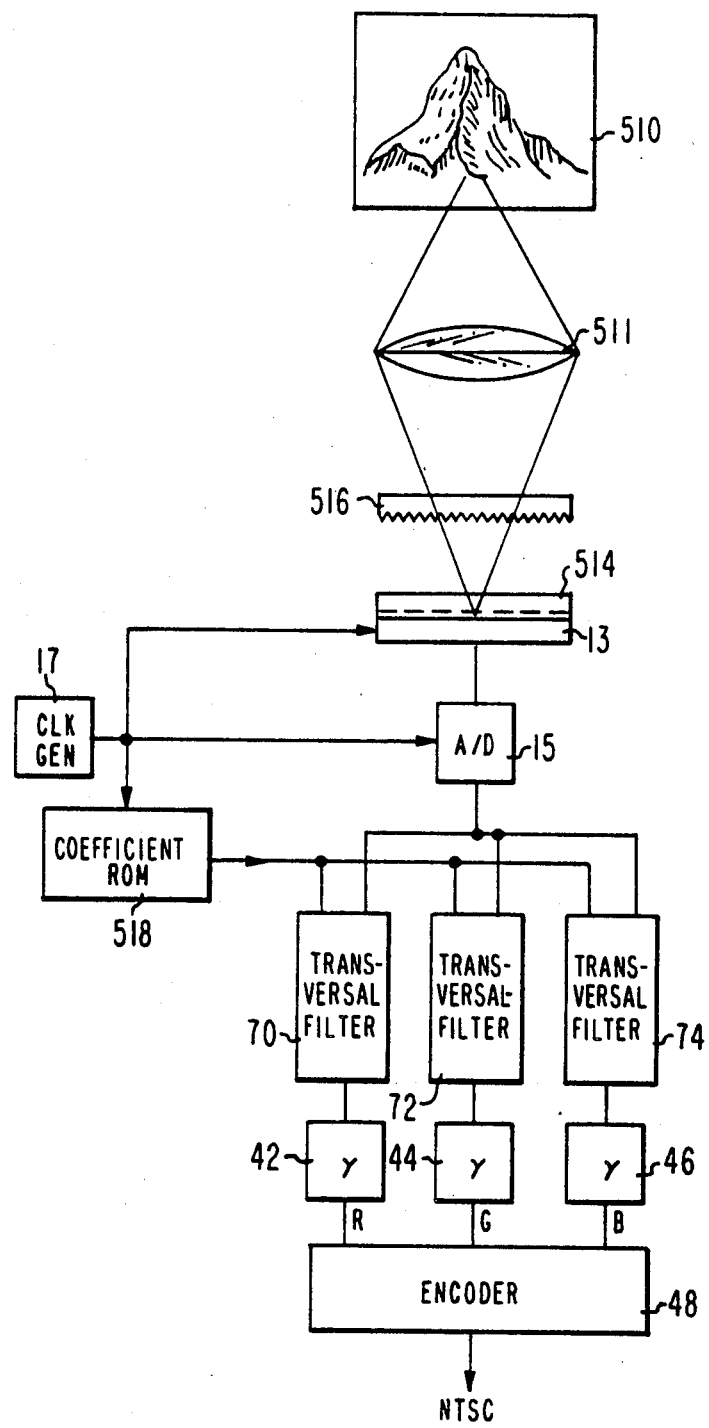
FIG. 5 shows a color camera having a digital decoding circuit for use with the present invention.

Referring to FIG. 5 a block diagram of a single-chip color camera is illustrated. The signal processing for the camera of FIG. 5 is performed by digital techniques. An image 510 is imaged by lens 511 onto CCD imager 13. The imager is formed having a checkerboard color filter 514 provided thereon, illustratively, the color pattern of filter 514 may be of the type shown in FIG. 4a. A diffuser 516 is interposed between the image 510 and imager 13 to reduce aliasing effects (discussed above). CCD imager 13 under the control of clock generator 17 provides a sampled analog signal which is converted into a digital signal by analog-to-digital converter 15. The resulting digital signal is applied to transversal filters 70, 72 and 74. A set of coefficients are switched into each transversal filter under the control of clock generator 17 via coefficient ROM 18. The output signals from filters 70, 72 and 74 which are representative of the R, G and B signals, respectively, are respectively applied to gamma correction circuits 42, 44 and 46 whose outputs are applied to NTSC encoder 48 for providing a composite NTSC signal.

Figure 6:
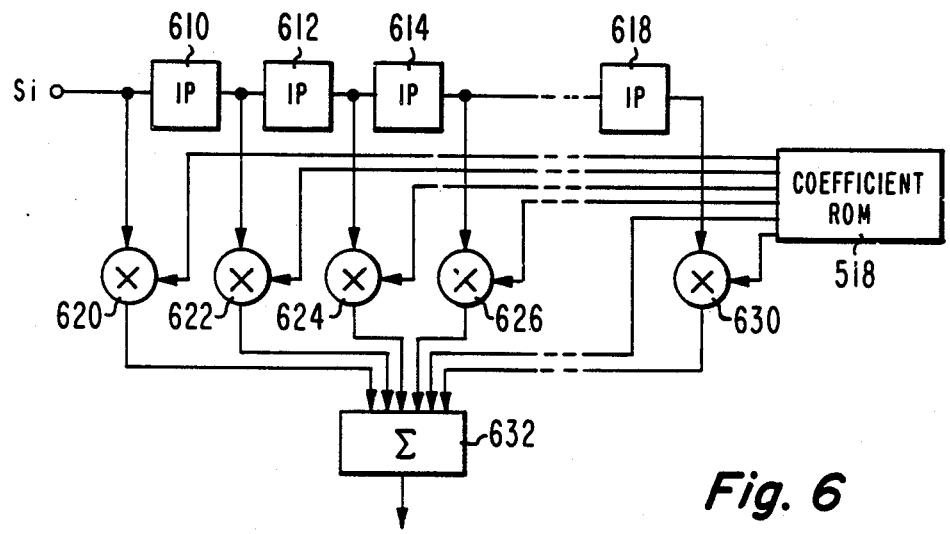
FIG. 6 shows details of the digital circuitry of FIG. 5.

Referring to FIG. 6 details of a transversal filter for use in the application of FIG. 5 are provided. Elements 610, 612, 614, . . . 618 are serially cascaded delay stages (illustratively, four), each of which delays the applied signal $S_i$ from A/D 15 (FIG. 5) for one sample period (one pixel). The applied signal $S_i$ and the output signals from elements 610, 612, 614, . . . 618 are respectively applied to coefficient multipliers 620, 622, 624, 626, . . . 630 (illustratively, five), each of which generates an output signal $C_k^{jl} S_{i+k}$, where k denotes the number of delays imposed on the applied signal $S_i$ and $C_k^{jl}$ is the value of the respective coefficient. The output signals from coefficient multipliers 620, 622, 624, 626, . . . 630 are summed in adder 632 to generate the filter output signal $v^{ij}$. Coefficient ROM 518 determines the value of each of the coefficients and changes the coefficients supplied at the desired intervals. Coefficient ROM 518 may be a memory device which is periodically cycled through various address codes to apply known coefficients to the multipliers in a predetermined sequence. In FIG. 6 the embodiment for one transversal filter is shown; it should be noted that the system of FIG. 5 requires three filters (one for each color component) which may, of course, be supplied with coefficients from the same coefficient ROM.

The coefficients $C_k^{jl}$ vary periodically and in phase with the color pattern sequence. Each $C_k^{jl}$ may be obtained by some optimization procedure by comparing the resulting picture with the input to the camera. A particular set of values were obtained by a least-square fit of the $v^{ij}$ values to the original picture used as the input to the camera simulation. A mathematical fit was performed in I, Q, Y-space and the I and Q values of the original picture were low pass filtered according to the NTSC standard. Obviously, this procedure is dependent on the original picture. Best results were obtained by using a random white noise pattern combined with a pattern of solid colored areas. Poorer results were obtained using typical scenes such as faces, landscapes, etc.

The particular set of values is listed in Appendix A for the R, G and B signals for k=15($-7 \geq m \geq 7$) for the p=6, S=2 case of FIG. 4a. These values were arrived at by using simulation equipment. Excellent camera performance was obtained for the two specific SHIFT patterns shown in FIGS. 4a and b (p=6, s=2). The coefficient values for k=15 of Appendix A represent a total of $k \times 3 \times p = 15 \times 3 \times 6 = 270$ coefficients which completely determine the digital processing.

Figure 7A:
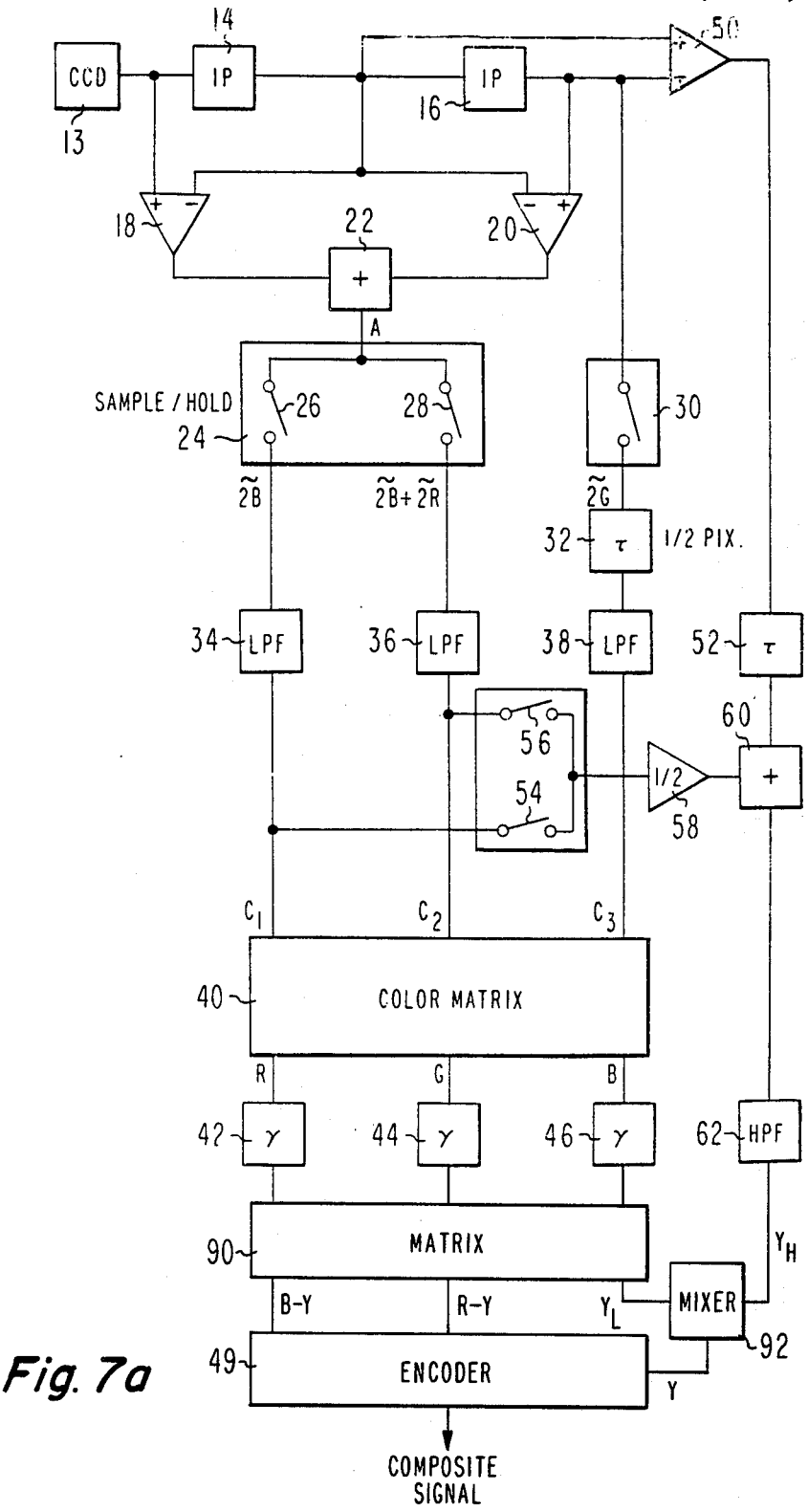
FIG. 7a is a block diagram of a color camera having analog signal processing for use with the present invention.

FIG. 7a shows a processing scheme for the pattern of FIG. 4a suited for analog circuitry. The color encoded signal from CCD imager 13 by way of amplifiers, clamping circuits, noise reducing circuits, etc. (not shown), all as known in the art, is fed into two cascaded one-pixel delay lines 14 and 16. The signal from imager 13 and the signals at the outputs of delay lines 14 and 16 represent image values from three neighboring pixels, and are used to derive a chrominance signal and a mixed-highs signal to provide good resolution for luminance. In particular, the center pixel value is subtracted from the values of the pixels to the right and left thereof in subtractors 18 and 20, respectively. Adder 22 combines the output signals of subtractors 18 and 20 to form signal A.

The chrominance channel (to the left in FIG. 7a) is sampled by sample-and-hold circuit 24 to provide two sample values for each six pixel interval. Thus switches 26 and 28 are independently switched, and the signal is fed alternately into two chrominance channels $C_1$ and $C_2$. The sampling portion of the sample and hold operation occurs upon closure of switches 26 or 28. Whenever the central element in the delay line corresponds to a vertical GG element (see lines 1 and 2 of FIG. 4a) switch 26 or 28 closes. In particular switch 26 closes whenever the elements to the left and right of the vertical GG elements are CyG and switch 28 closes whenever the elements to the left and right of the vertical GG elements are WG. Therefore switches 26 and 28 each close once every six pixels, but out-of-phase with respect to each other. Thus for a uniformly colored field, $C_1$ and $C_2$ represent the following values respectively. The bar indicates particular pixel signal values which are not equivalent to RGB of a television system. As described below a matrixing operation is performed to convert $\overline{R}$, $\overline{B}$ and $\overline{G}$ to R, B and G.

$$C_1 = (\overline{GCy}) + (\overline{CyG}) - 2(\overline{GG})$$
$$= 2(\overline{Cy} - \overline{G}) = 2\overline{B}$$
$$C_2 = (\overline{GW}) + (\overline{WG}) - 2(\overline{GG})$$
$$= 2(\overline{W} - \overline{G}) = 2(\overline{B} + \overline{R}) = 2\overline{B} + 2\overline{R}$$

A third chrominance component $C_3$ is obtained by sampling the (GG) values using sample-and-hold circuit 30. Thus chrominance sampling of the $C_3$ signal takes place two out of six pixels. A one-half pixel delay in delay line 32 is provided. Delay 32 is provided to align the signals in the three chrominance channels. Since the $C_1$ and $C_2$ signals are each sampled for one pixel out of a six pixel set they are centered at a different point than the $C_3$ which is sampled two pixels out of a six pixel set. Therefore, a 1.5 pixel shift is needed between the $C_1$, $C_2$ signals and the $C_3$ signal. A one pixel delay of $C_3$ with respect to $C_1$ and $C_2$ is provided by delay line 16, the remaining one half pixel delay by line 32. Thus $$C_3 = 2\overline{G}$$

Figure 7B:
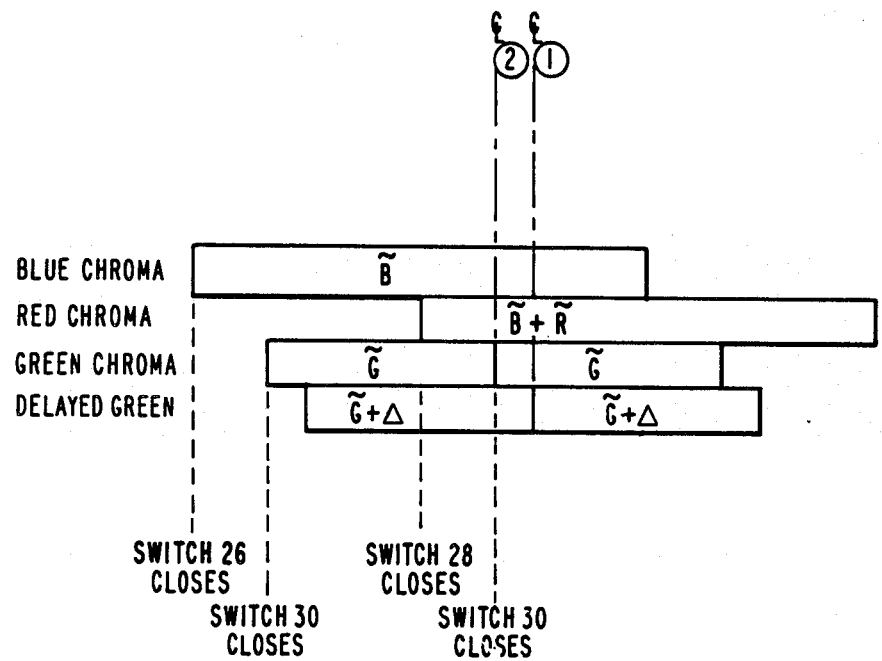

An explanation of the centering operation of the $C_3$ signal will be described with reference to FIG. 7b. FIG. 7b shows the switching closing and signal existence for each of the chrominance channels, i.e., $C_1 = \overline{B}$; $C_2 = \overline{B} + \overline{R}$ and $C_3 = \overline{G}$. After the closing of switch 26 the $\overline{B}$ signal exists for six pixels and after the closing of switch 28 the $\overline{B} + \overline{R}$ signal exists for six pixels. In the $\overline{G}$ channel switch 30 closes twice during a six pixel sequence. The center of the combination of the $\overline{B}$ and $\overline{B} + \overline{R}$ is one-half of a pixel displaced with respect to the center line of the green signal which resides at the time of one of the switch 30 closings. It should be remembered that the $\overline{G}$ signal has been delayed by one pixel in pixel delay 16 with respect to the other two signals. To align the center line of the combination of $\overline{B}$ and $\overline{B} + \overline{R}$ with the $\overline{G}$, the $\overline{G}$ signal must be delayed by another one-half pixel (as shown in FIG. 7b). This additional one-half pixel delay is provided by delay 32.

Figure 8:
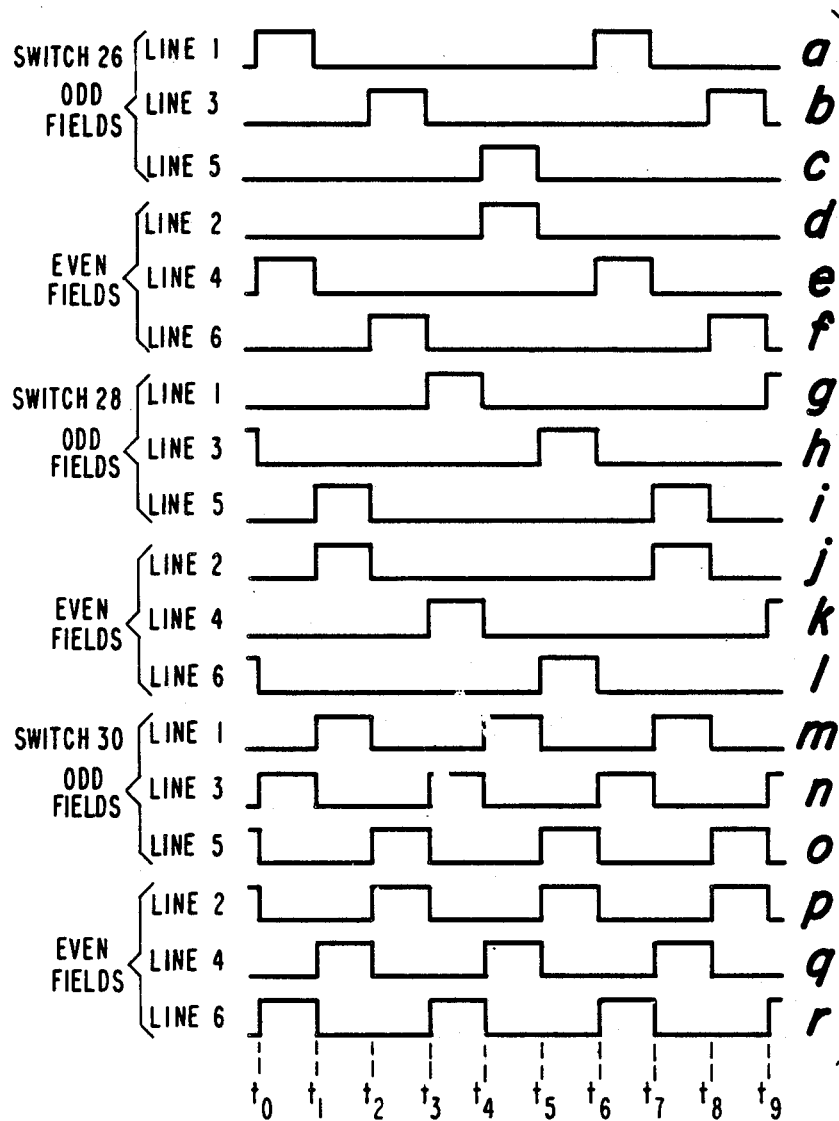

Referring to FIG. 8 a timing diagram is provided for aiding in understanding how the sampling of the signals operate via switches 26, 28 and 30 of FIG. 7. The waveform diagrams a–r represent the sampling of the switches (high level represents switch closure). For example, with respect to waveform a, switch 26 is closed from $t_o$ to $t_1$ and $t_6$ to $t_7$ (i.e., when the waveform is high), thus signal A of FIG. 7a is sampled from $t_o$ to $t_1$ and held at the $t_1$ value from $t_1$ to $t_6$ by a signal storage device such as a capacitor (not shown) for the $C_1$ channel. The time periods $t_o$ to $t_1$, $t_1$ to $t_2$, etc. represent time periods of a sampled analog signal during pixel signal periods. $t_o$ represents the starting time for each horizontal scan line in the raster. Waveforms a, b and c (also; g, h and i; m, n and o) represent the sequence of horizontal scans for an odd field, i.e., the sequence repeats for the remainder of the field, and waveforms d, e and f (also; j, k, l; p, q, r) for even fields. The waveform for each scan line, i.e., a, b, c, etc. repeats after six samples (i.e., $t_o$–$t_6$ repeats) for each sample line.

Signals in channels $C_1$, $C_2$ and $C_3$ are low pass filtered in LPFs 34, 36 and 38, respectively, having a cut off frequency of about 700 kHz with a gradual roll off so that high frequencies produced by sampling are eliminated. Said signals are matrixed in color matrix 40 to produce R, G and B output signals.

In any color television system there are two basic terminal operations: the derivation of color information from an imager by appropriate pickup apparatus and the reproduction of said image from said color information by suitable image reproducing apparatus. The pickup operation generally requires the analysis of light from the image into specific component colors, while the image reproducing operation generally requires reproduction of the image in specific component colors, which are combined in one manner or another to duplicate the appearance of the signal image to a viewer. It may well be appreciated that if the image information supplied to the image reproducer is not in terms of component colors which the reproducer employs to reconstruct the image, a faithful reproduction of the original image will not be achieved. Thus, if the primary colors in which the pickup apparatus analyzes light from the subject image do not correspond to the primary colors in which the reproducer establishes component images, the system must provide means, such as a masking circuit, for converting the originally derived color information into terms of the reproducer primaries if faithful reproductions are to be achieved. Conversion may be effected by suitable mixing of the signals originally derived to provide mixture signals which substantially correspond to the reproducer primaries.

At each pixel location (m, n) a color $C_{mn}$ represents a color, e.g., yellow, cyan, etc. Each color $C_{mn}$ can be characterized by three coefficients, $t^k(C_{mn})$ where $k = 1$, 2, 3, which define for any image input $I^k(mn)$ representative of the signal derived from the pixel location the electrical output $P_{mn}$ generated at the pixel in terms of R, G, B primaries:

$$P_{mn} = t^k(C_{mn})I^k(mn)$$

The coefficients $t^k(C_{mn})$ representing transmission characteristics of each filter element can be calculated for any spectral filter transmission knowing the scene illumination (color temperature T) and the spectral response of the CCD. The Table below provides typical unnormalized values for coefficients $t^k$ for R, G, B, primaries assuming T=3200° K. (incandescent light) and typical response of thinned, backside illuminated CCD's.

|  |  | $t^1(R)$ | $t^2(G)$ | $t^3(B)$ |
|---|---|---|---|---|
| White | Wh | 1.513 | .963 | .803 |
| Yellow | Ye | 1.327 | .777 | .406 |
| Cyan | Cy | .813 | .813 | .653 |
| Green | G | .627 | .627 | .310 |
| Magenta | Mg | .880 | .330 | .490 |
| Red | R | .700 | .150 | .150 |
| Blue | B | .180 | .180 | .340 |

Therefore, the matrix 40 converts the chrominance signals $C_1$, $C_2$, $C_3$ derived from the sample and hold circuits to R, G, B signals which substantially correspond to television signals. Matrix 40 may be formed by a resistive network for forming the R, G, B signals. The equations for deriving R, G, B from $C_1$, $C_2$ and $C_3$ are as follows:

$$R = -0.45C_1 + 0.58C_2 - 0.2C_3$$

$$B = 0.66C_1 + 0.05C_2 - 0.135C_3$$

$$G = -0.18C_1 - 0.135C_2 + 0.36C_3$$

The R, G and B signals are gamma corrected in circuits 42, 44 and 46, respectively, and then applied to matrix 90. The low frequency R, G and B signals are combined in matrix 90 by conventional circuitry, for example, a resistive matrix network, to produce $Y_L$, a low-frequency luminance signal, R-Y, the red difference signal, and B-Y, the blue difference signal.

A separate so-called mixed-high channel (to the right in FIG. 7) is used to provide high-frequency luminance. The basic signal is obtained by adding two successive pixels in adder 50 (the summation over two pixels is done to effect alias reduction and to provide colorimetric balance representative of luminance) and then applying the resulting sum signal to equalizing delay line 52, which is needed due to the delays caused by LPFs 34, 36 and 38 and other delays. The colorimetric composition of the mixed-high signal is not constant, and periodically varies (p=6) for the pattern of FIG. 4a in the following sequence for line 1 of the filter of FIG. 4a:

$(3\overline{GCy})$, $(2\overline{GWCy})$, $(3\overline{GW})$, $(3\overline{GW})$, $(2\overline{GCyW})$, $(3\overline{GCy})$, etc. As a consequence, even in a field with uniform color and brightness, the mixed-high signal generally contains high frequencies which lead to a fixed pattern representative of the filter in the luminance channel.

FIG. 7a shows a rather simple way to overcome the above deficiency, which method may possibly be applied in color encoding patterns other than SHIFT. The concept is to add into the mixed-high channel, signals from the low pass filtered chrominance channels ($C_1$, $C_2$ and $C_3$) such that the total signal has constant colorimetric composition. For the pattern of FIG. 4a this is achieved by adding $\frac{1}{2}$ $C_1 = \overline{B}$ to the signal $(3\overline{GW})$ and $\frac{1}{2}$ $C_2(\overline{B}+\overline{R})$ to the signal $(3\overline{GCy})$ using switches 54 and 56 respectively, 6 db (one-half amplitude attenuator 58, and using adder 60, and by leaving the third signals $(2\overline{GCyW})$ unchanged. The six pixel sequence for closing the switches is 56, (no closure), 54 (no closure), 56, (this sequence is repeated).

Figure 9:
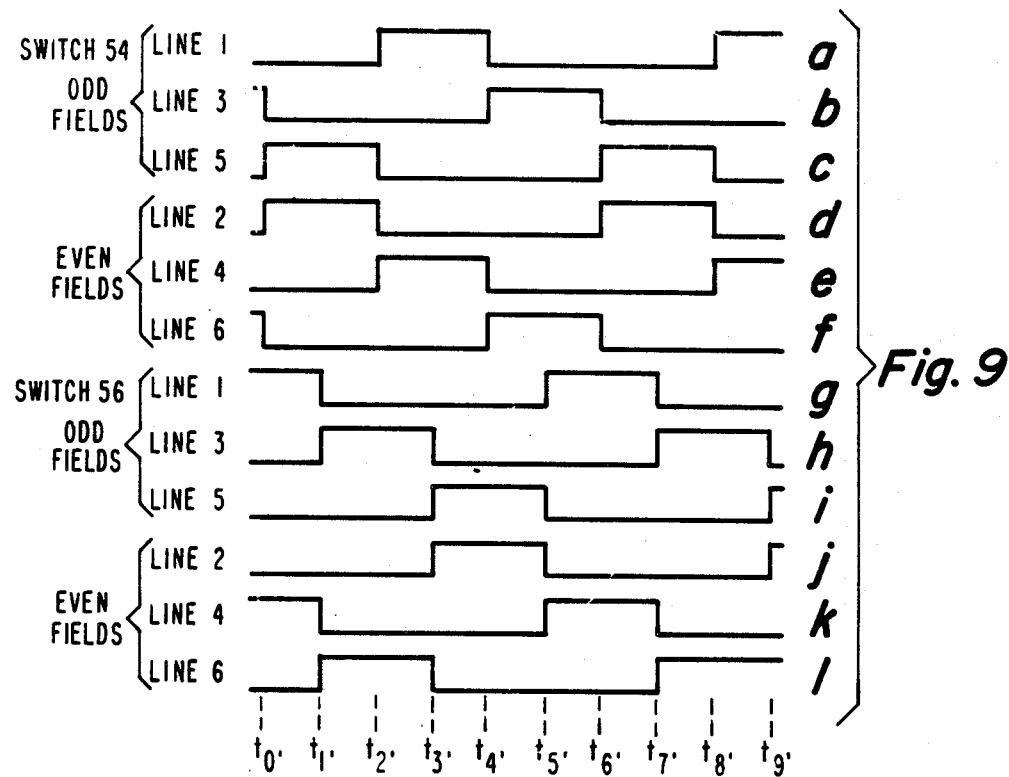

Referring to FIG. 9, a timing diagram is provided for understanding the operation of switches 56 and 58 for providing constant colorimetric composition to the mixed-highs luminance signal. The waveform diagrams a-1 represent the sampling of each switch (high level represents the switch closure). The time periods of FIG. 9 correspond to the time periods of a sampled analog signal of FIG. 8 during pixel signal periods delayed by an appropriate amount. $t_o'$ represents the starting time for each horizontal scan line in the raster such that $t_o'-t_1'$ represents the time period that the first pixel (summation of the signal derived from four filter elements) is present at the input to adder 60. Waveforms a, b, c and g, h, i repeat for odd fields and waveforms d, e, f and j, k, l repeat for even fields. Furthermore, each waveform repeats after six samples (i.e., $t_o'-t_6'$ repeats). As one easily verifies, the mixed-high signal now has a constant composition of $$2\overline{GCyw} = \overline{R} + 4\overline{G} + 2\overline{B}.$$

This is a good approximation to luminance, if one remembers that $\overline{R}$, $\overline{G}$, and $\overline{B}$ are not pure R, G, B signals in the video sense, but rather the signals as they are obtained using typical non-ideal filters having gradual roll off spectral transmission characteristics as described above.

The corrected mixed-high signal is then high-frequency pass filtered by HPF 62, which ideally has a complementary characteristic to that of LPFs 34, 36 and 36, to form a high-frequency luminance signal $Y_H$, and then added to the low frequency luminance signal in mixer 92 to form a wideband luminance signal Y. The color difference and luminance signals are then applied to NTSC encoder 49 wherein a composite color television signal is generated by known techniques. It has been found that it is satisfactory not to gamma-correct the high-passed signal such as needed for the low-passed chrominance signals.

The electronic processing for the pattern of FIG. 4a as shown in FIG. 7a has been extensively simulated and shown to yield excellent performance. For the pattern of FIG. 4b a processing method similar to FIG. 7a has also been simulated. Noticeable improvements with respect to FIG. 4a in the signal-to-noise ratio (about 3 dB) and aliasing along diagonals were demonstrated in the simulation.

Figure 10:
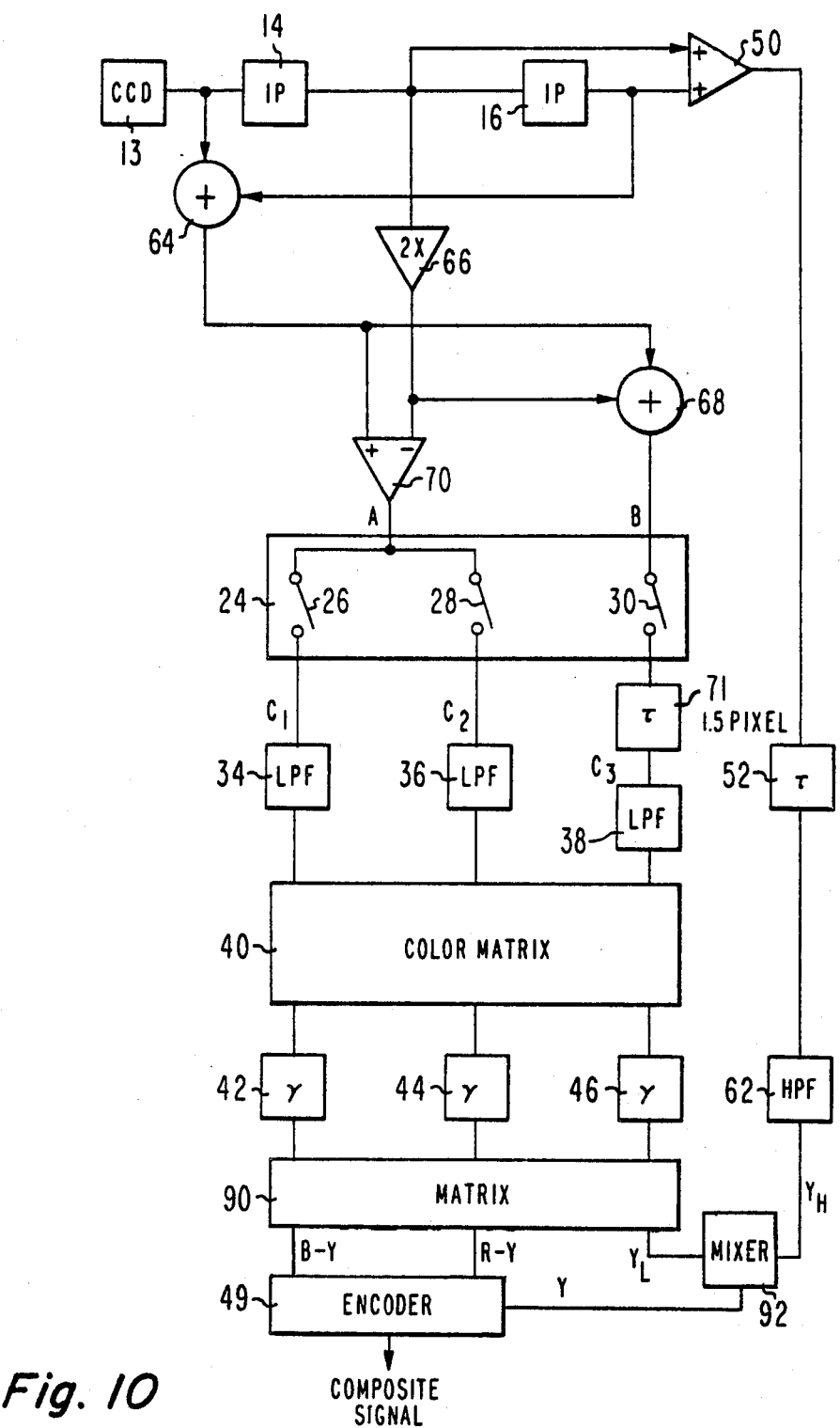
FIG. 10 shows another embodiment of a color camera in accordance with the present invention.
Figure 11:
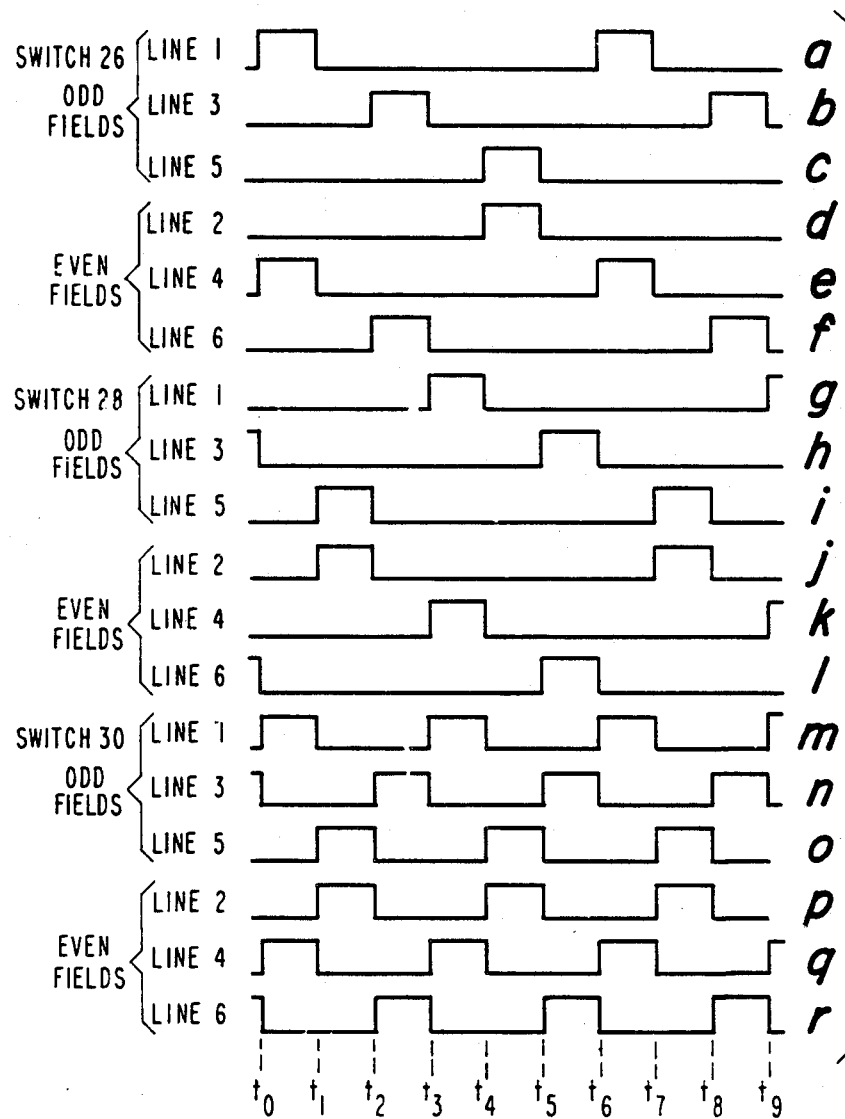
FIG. 11 shows waveform diagrams for use in describing the operation of the signal processing of FIG. 10.

FIG. 10 shows a circuit for analog decoding of the pattern of FIG. 4b, wherein elements corresponding to elements in FIG. 7a have been given corresponding reference numerals. Since the operation is similar to that of FIG. 7a, it will be briefly described. The three independent color component signals $C_1$, $C_2$ and $C_3$ are obtained in the following way. First, two weighted sum signals of neighboring elements are formed by adders 64 and 68, amplifier 66, and difference amplifier 70. Signal A is the weighted sum of neighboring elements having weights 1, −2, 1, and signal B is the weighted sum of elements having the weights 1, 2, 1. Sample-and-hold circuit 24 samples the signals at three-pixel intervals, i.e., wherever the center element is YeYe or GG. Switches 26 and 28 alternate while switch 30 closes at the three pixel interval. In particular switch 26 closes whenever the center element is YeYe, switch 28 closes whenever the center element is GG and switch 30 closes with switches 26 and 28. Referring to FIG. 11 a timing diagram is provided for aiding in understanding how the sampling of the signals operates via switches 26, 28 and 30 of FIG. 10. The waveform diagrams a-r represent the sampling of the switches. The operating details of FIG. 11 are very similar to that of FIG. 8 and, therefore, a detailed explanation will not be provided.

For a uniformly colored field, $C_1$, $C_2$ and $C_3$ represent the following signal values:

$$C_1 = \overline{GCy} - \overline{4Ye} + \overline{CyG} = \overline{2B} - \overline{4R}$$

$$C_2 = \overline{YeW} - \overline{4G} + \overline{WYe} = \overline{2B} + \overline{4R}$$

$$\overline{GCy} + \overline{4Ye} + \overline{CyG}$$

$$C_3 = \overline{YeW} + \overline{4G} + \overline{WYe} = \overline{8G} + \overline{2B} + \overline{4R}$$

Signal $C_3$ is delayed by $1\frac{1}{2}$ pixels, in delay line 71 to center the pixel elements in each of the chrominance channels. The three signals C1, C2 and C3 are low pass filtered in filters 34, 36, 38, respectively, to provide low frequency chrominance signals. The sum of neighboring pixel signals can be used for the mixed-high signal without any additional correction circuitry. A small correction for the blue content could be provided, but the error is not very visible on the screen. The mixed-high signal is then high-frequency pass filtered by HPF 62 to provide a high-frequency luminance signal $Y_H$. The low pass filtered chrominance signals $C_1$, $C_2$ and $C_3$ are matrixed in color matrix 40 to form R, G and B signals which are gamma corrected and applied to matrix 90. The gamma corrected signals are applied to matrix 90 for forming the color difference signals (B-Y and R-Y) and low frequency luminance $Y_L$. The low frequency and high frequency luminance signals are added together in mixer 92 to form the wideband luminance signal. The luminance and color difference signals are applied to encoder 49 to form a composite NTSC signal.

At certain levels of vertical crosstalk (signal from one line getting into signal from adjacent line) in the CCD, the pattern of FIG. 4a or FIG. 4b degenerates to a two color encoding pattern where blue and green cannot be distinguished. If vertical crosstalk is a problem the pattern of FIG. 12 having p=8, S=2, may provide satisfactory results with CCD imagers having substantially higher crosstalk (on the order of 1.5 times) and provides performance at least equal to that of FIG. 4a. The color sequence for FIG. 12 is G, Cy, G, Cy, W, G, W, G. Signal-to-noise is substantially improved over that of the pattern of FIG. 4b. No analog demultiplexing scheme has been found which is suitable for signal processing the signal generated by the pattern of FIG. 12. However, the general digital processing scheme of FIG. 5 provides very satisfactory results. The particular set of coefficients for processing the signal derived from the pattern of FIG. 12 is listed in Appendix B for the R, G and B signals for k=15 ($-7 \geq m \geq 7$) for the p=8, S=2 case.

We have analyzed a large number of SHIFT patterns, restricting ourselves so far to periods $p \leq 8$. The total number of different patterns with p=8 is too large for a systematic study. The three specific examples of SHIFT patterns discussed above, with respect to FIGS. 4a, 4b and 12 represent our best findings to date. However, it is very likely that even better patterns exist, particularly for p>8.

APPENDIX A

| m | j | 1 = 1 | 2 | 3 | 4 | 5 | 6 |
|---|---|---|---|---|---|---|---|
| −7 | 1 | .082 | −.049 | .089 | −.045 | .089 | −.033 |
| −6 | 1 | −.297 | .197 | −.241 | .126 | −.276 | .132 |
| −5 | 1 | .505 | −.338 | .271 | −.297 | .246 | −.383 |
| −4 | 1 | −.566 | .373 | −.420 | .290 | −.481 | .686 |
| −3 | 1 | .448 | −.628 | .316 | −.636 | .735 | −.819 |
| −2 | 1 | −.668 | .351 | −.804 | .792 | −.891 | .508 |
| −1 | 1 | .394 | −.668 | 1.246 | −.710 | .640 | −.370 |
| 0 | 1 | −.185 | 1.626 | −.651 | .848 | −.065 | .459 |
| 1 | 1 | 1.015 | −.969 | .777 | −.461 | .302 | −.218 |
| 2 | 1 | −.922 | .650 | −.814 | .234 | −.455 | .488 |
| 3 | 1 | .532 | −.759 | .259 | −.444 | .470 | −.639 |
| 4 | 1 | −.544 | .255 | −.291 | .459 | −.446 | .421 |
| 5 | 1 | .218 | −.207 | .326 | −.331 | .332 | −.382 |
| 6 | 1 | −.225 | .139 | −.242 | .167 | −.340 | .100 |
| 7 | 1 | .117 | −.030 | .076 | −.088 | .075 | −.036 |
| −7 | 2 | .032 | −.063 | .003 | .021 | −.057 | .041 |
| −6 | 2 | −.192 | .079 | .036 | −.150 | .202 | −.025 |
| −5 | 2 | .227 | .090 | −.215 | .402 | −.129 | −.147 |
| −4 | 2 | .085 | −.327 | .619 | −.240 | −.022 | −.240 |
| −3 | 2 | −.487 | .811 | −.434 | .010 | .067 | .043 |
| −2 | 2 | 1.119 | −.636 | .039 | −.025 | .136 | −.622 |
| −1 | 2 | −.748 | .376 | .332 | .416 | −.567 | 1.664 |
| 0 | 2 | .937 | .622 | .465 | −.407 | 1.975 | −.763 |
| 1 | 2 | .064 | .084 | −.398 | 1.554 | −.847 | .899 |
| 2 | 2 | −.058 | −.373 | .977 | −.822 | .527 | −.354 |
| 3 | 2 | −.250 | .699 | −.606 | .368 | −.200 | .015 |
| 4 | 2 | .510 | −.381 | .304 | −.011 | .014 | −.127 |
| 5 | 2 | −.198 | .158 | .017 | −.074 | −.082 | .302 |
| 6 | 2 | −.037 | −.004 | −.120 | −.024 | .151 | −.108 |
| 7 | 2 | .058 | −.018 | .029 | .032 | −.048 | −.016 |
| −7 | 3 | −.076 | .296 | −.052 | .048 | .112 | .011 |
| −6 | 3 | .498 | −.652 | .048 | .046 | −.235 | −.140 |
| −5 | 3 | −.831 | .312 | .127 | −.128 | −.135 | .637 |
| −4 | 3 | .359 | .086 | −.229 | −.251 | .800 | −.953 |
| −3 | 3 | .020 | −.328 | −.320 | .925 | −1.340 | .360 |
| −2 | 3 | −.324 | −.332 | .959 | −1.640 | .581 | −.048 |
| −1 | 3 | −.256 | 1.110 | −1.432 | .964 | −.044 | .060 |
| 0 | 3 | 1.523 | −1.020 | 1.147 | .101 | .424 | −.211 |
| 1 | 3 | −1.535 | .779 | .001 | −.014 | −.339 | 1.422 |
| 2 | 3 | .753 | −.099 | −.405 | −.272 | 1.022 | −1.857 |
| 3 | 3 | −.136 | .398 | −.128 | .735 | −1.528 | .816 |
| 4 | 3 | −.289 | −.022 | .618 | 1.106 | .714 | −.133 |
| 5 | 3 | .034 | .501 | −.873 | .560 | −.066 | −.187 |
| 6 | 3 | .234 | −.649 | .384 | −.117 | −.280 | .004 |
| 7 | 3 | −.166 | .211 | −.041 | .010 | .122 | .100 |

APPENDIX B

| m | j | 1 = 1 | 2 | 3 | 4 | 5 | 6 | 7 | 8 |
|---|---|---|---|---|---|---|---|---|---|
| −7 | 1 | .050 | −.043 | .052 | −.038 | .056 | −.058 | .038 | −.086 |
| −6 | 1 | −.139 | .150 | −.120 | .122 | −.191 | .087 | −.215 | .135 |
| −5 | 1 | .186 | −.208 | .173 | −.300 | .138 | −.307 | .181 | −.247 |
| −4 | 1 | −.227 | .270 | −.331 | .215 | −.407 | .274 | −.324 | .365 |
| −3 | 1 | .307 | −.438 | .222 | −.566 | .361 | −.489 | .529 | −.360 |
| −2 | 1 | −.557 | .194 | −.645 | .368 | −.693 | .616 | −.536 | .321 |
| −1 | 1 | .310 | −.361 | .506 | −.539 | .980 | −.436 | .515 | −.387 |
| 0 | 1 | −.108 | .597 | −.298 | 1.213 | −.308 | .664 | −.191 | .412 |
| 1 | 1 | .429 | −.368 | .884 | −.444 | .514 | −.358 | .296 | −.298 |
| 2 | 1 | −.519 | .455 | −.543 | .334 | −.555 | .177 | −.538 | .244 |
| 3 | 1 | .419 | −.361 | .316 | −.445 | .210 | .436 | .274 | −.397 |
| 4 | 1 | −.239 | .267 | −.318 | .214 | −.338 | .275 | −.313 | .397 |
| 5 | 1 | .178 | −.282 | .148 | −.358 | .176 | −.303 | .308 | −.230 |

-continued

APPENDIX B

| m | j | l = 1 | 2 | 3 | 4 | 5 | 6 | 7 | 8 |
|---|---|---|---|---|---|---|---|---|---|
| 6 | 1 | −.198 | .104 | −.250 | .130 | −.174 | .225 | −.181 | .131 |
| 7 | 1 | .048 | −.083 | .063 | −.053 | .075 | −.060 | .066 | −.064 |
| −7 | 2 | .007 | −.040 | .085 | −.004 | −.054 | .114 | −.065 | .074 |
| −6 | 2 | −.047 | .162 | −.084 | −.067 | .241 | −.181 | .314 | −.069 |
| −5 | 2 | .129 | −.118 | −.100 | .290 | −.252 | .462 | −.166 | −.047 |
| −4 | 2 | −.084 | .098 | .439 | −.289 | .590 | −.178 | −.029 | .240 |
| −3 | 2 | −.157 | .493 | −.399 | .664 | −.235 | −.113 | .279 | −.161 |
| −2 | 2 | .538 | −.534 | .784 | −.349 | −.194 | .287 | −.234 | −.238 |
| −1 | 2 | −.512 | 1.261 | −.313 | .048 | .576 | −.095 | −.128 | .832 |
| 0 | 2 | 1.633 | −.298 | .385 | .763 | .030 | .027 | 1.051 | −.441 |
| 1 | 2 | −.464 | .332 | .379 | −.121 | −.059 | .777 | −.506 | 1.354 |
| 2 | 2 | .131 | .019 | −.244 | −.167 | .420 | −.526 | .922 | −.525 |
| 3 | 2 | .048 | .145 | −.091 | .368 | −.378 | .808 | −.361 | .115 |
| 4 | 2 | −.062 | .034 | .323 | −.259 | .688 | −.240 | .087 | .119 |
| 5 | 2 | −.059 | .200 | −.218 | .441 | −.229 | .006 | .112 | −.090 |
| 6 | 2 | .166 | −.142 | .337 | −.151 | .058 | .104 | −.106 | −.016 |
| 7 | 2 | −.030 | .141 | −.075 | .045 | −.005 | −.050 | .028 | .028 |
| −7 | 3 | −.068 | .193 | −.246 | .110 | .002 | −.062 | .065 | −.029 |
| −6 | 3 | .395 | −.650 | .368 | −.112 | −.077 | .118 | −.180 | −.084 |
| −5 | 3 | −.963 | .523 | −.224 | −.121 | .135 | −.249 | −.135 | .491 |
| −4 | 3 | .711 | −.259 | −.083 | .216 | −.295 | −.131 | .624 | −1.109 |
| −3 | 3 | −.363 | −.084 | .200 | −.440 | −.160 | .656 | −1.249 | .787 |
| −2 | 3 | −.106 | .124 | −.463 | −.251 | .672 | −1.448 | .794 | −.479 |
| −1 | 3 | .228 | −.155 | −.180 | .971 | −1.369 | 1.062 | −.401 | .143 |
| 0 | 3 | .010 | −.037 | 1.254 | −1.191 | 1.323 | −.350 | .421 | .318 |
| 1 | 3 | −.095 | 1.023 | −1.425 | 1.105 | −.505 | .300 | .186 | −.227 |
| 2 | 3 | .675 | −1.585 | .852 | −.560 | .017 | .078 | −.504 | −.189 |
| 3 | 3 | −1.321 | .839 | −.428 | .021 | .170 | −.459 | −.054 | .602 |
| 4 | 3 | .747 | −.334 | .048 | .189 | −.448 | .040 | .473 | −1.023 |
| 5 | 3 | −.272 | −.024 | .130 | −.478 | .023 | .284 | −.782 | .547 |
| 6 | 3 | −.013 | .114 | −.363 | .075 | .187 | −.505 | .371 | −.184 |
| 7 | 3 | .026 | −.160 | .088 | .043 | −.129 | .175 | −.089 | .022 |

What is claimed is:

1. A camera, comprising:
a solid-state imager having a plurality of collection sites arranged in rows for collecting fields of unprocessed signals generated in response to received radiant energy from a scene;
a color filter, interposed between said scene and said imager, having color filter elements arranged in rows and columns, a pair of said rows of said color filter elements, during a given field, being instantaneously aligned with a row of said collection sites, each of said rows of said color filter elements comprising a repeating sequence of colors, sequential rows of said color filter elements being shifted in the row direction with respect to the preceding row; the combination of vertically aligned filter elements from sequential rows providing at least two independent color combinations; and
signal processing means, coupled to said imager, for generating a processed signal representative of said scene, including information related to the color content of said scene.

2. The camera according to claim 1 wherein said sequence is six color filter elements long and said shift is uniformly two color filter elements in each sequential row.

3. The camera according to claim 2 wherein said sequence comprises color filter elements arranged in the order of A, B, A, A, C, A wherein A, B and C are different colors.

4. The camera according to claim 3 wherein the A element is substantially green, the B element is substantially cyan and the C element is substantially white.

5. The camera according to claim 2 wherein said sequence comprises color filter elements arranged in the order of A, B, A, C, D, C wherein A, B, C and D are different colors.

6. The camera according to claim 5 wherein the A element is substantially yellow, the B element is substantially cyan, the C element is substantially green and the D element is substantially white.

7. The camera according to claim 1 wherein said sequence is eight color filter elements long and said shift is uniformly two color filter elements in each sequential row.

8. The camera according to claim 7 wherein said sequence comprises color filter elements arranged in the order of A, B, A, B, C, A, C, A and wherein A, B and C are different colors.

9. The camera according to claim 8 wherein the A element is substantially green, the B element is substantially cyan and the C element is substantially white.

10. The camera according to claim 1 wherein said signal processing means processes said unprocessed signals by digital techniques.

11. The camera according to claim 1 further comprising a diffuser interposed between said scene and said imager for reducing sampling artifacts.

12. The camera according to claim 1 wherein said solid-state imager is a CCD frame-transfer device.

13. The camera according to claim 12 wherein said sequence is six color filter elements long and said shift is uniformly two color filter elements in each sequential row.

14. The camera according to claim 13 wherein said sequence comprises color filter elements arranged in the order of A, B, A, A, C, A wherein A, B and C are different colors.

15. The camera according to claim 14 wherein the A element is substantially green, the B element is substantially cyan and the C element is substantially white.

16. The camera according to claim 13 wherein said sequence comprises color filter elements arranged in the order of A, B, A, C, D, C wherein A, B, C and D are different colors.

17. The camera according to claim 16 wherein the A element is substantially yellow, the B element is substantially cyan, the C element is substantially green and the D element is substantially white.

18. The camera according to claim 12 wherein said sequence is eight color filter elements long and said shift is uniformly two color filter elements in each sequential row.

19. The camera according to claim 18 wherein said sequence comprises color filter elements arranged in the order of A, B, A, B, C, A, C, A and wherein A, B and C are different colors.

20. The camera according to claim 19 wherein the A element is substantially green, the B element is substantially cyan and the C element is substantially white.

21. The camera according to claim 12 wherein said signal processing means processes said unprocessed signals by digital techniques.

22. The camera according to claim 12 further comprising a diffuser interposed between said scene and said imager for reducing sampling artifacts.

23. A camera, comprising:
a solid-state imager having a plurality of collection sites arranged in rows for collecting fields of unprocessed signals generated in response to received radiant energy from a scene;
a color filter, interposed between said scene and said imager, having color filter elements arranged in rows and columns, a pair of said rows of said color filter elements, during a given field, being instantaneously aligned with a row of said collection sites, each of said rows of said color filter elements comprising a sequence of color filter elements which repeats after a predetermined number of color filter elements, sequential rows of said color filter elements being shifted in the row direction with respect to the preceding row, such that the combination of vertically aligned filter elements from sequential rows provides a sequence of at least two independent color combinations which repeats after a number of color combinations corresponding to said predetermined number and which has like color combinations symmetrically disposed about one color combination of said color combination sequence; and
signal processing means, coupled to said imager, for generating a processed signal representative of said scene, including information related to the color content of said scene.

24. The camera according to claim 23 wherein said sequence of six color filter elements long and said shift is uniformly two color filter elements in the row direction.

25. Apparatus for processing a signal derived from an imager having pixels comprising discrete collection sites for collecting unprocessed signals generated in response to received energy from a scene and a color encoding filter interposed between said scene and said imager; said apparatus comprising:
deriving means for deriving unprocessed signals from a center pixel and horizontally adjacent pixels;
subtracting means for subtracting said signal from said center pixel from each of said signals from said adjacent pixels to form a pair of difference signals;
first sampling means for alternately sampling said difference signals;
second sampling means for sampling said signal from said center pixel, said first and second sampling means sampling out-of-phase; and
a color matrix having three inputs for respectively receiving the sampled difference signals and said sampled signal from said center pixel for providing component color signals.

26. The apparatus according to claim 25 further comprising:
delay means, coupled to receive said sampled signal from said second sampling means, for effecting a time alignment of said sampled difference signals with said sampled signal from said second sampling means.

27. The apparatus according to claim 25 further comprising:
a signal path for providing a mixed high signal representative of luminance information in said scene, and
combining means, coupled to receive said component color signals and said mixed high signal, for combining said signals to provide a television signal representative of said scene.

28. The apparatus according to claim 27 further comprising:
third sampling means, coupled to receive said sampled difference signals, for providing signals to said signal path to balance colorimetrically the luminance level of said mixed high signal.

29. Apparatus as claimed in claim 25, further comprising said imager and said filter.

30. Apparatus as claimed in claim 29, wherein said imager comprises a frame transfer imager, and said filter comprises a plurality of color filter elements arranged in rows instantaneously aligned with said collection sites and having a height of one-half a pixel height, each of said rows comprising a repeating sequence of filter elements of at least two independent colors, the color sequence of sequential rows being shifted in the row direction with respect to the color sequence of each preceding row.

31. Apparatus for processing a signal derived from an imager having pixels comprising discrete collection sites for collecting unprocessed signals generated in response to received radiant energy from a scene and a color encoding filter interposed between said scene and said imager; said apparatus comprising:
deriving means for deriving unprocessed signals from a center pixel and horizontally adjacent pixels;
first summing means for summing the unprocessed signals from said horizontally adjacent pixels to form a first sum signal;
subtracting means for subtracting a weighted value of said unprocessed signal from said center pixel from said first sum signal to form a difference signal;
second summing means for summing said weighted value signal and said first sum signal to form a second sum signal;
sampling means for sampling said difference signal and said second sum signal to generate chrominance signals in accordance with the chrominance content of said scene.

* * * * *

UNITED STATES PATENT AND TRADEMARK OFFICE
CERTIFICATE OF CORRECTION

PATENT NO. : 4,591,900

DATED : May 27, 1986

INVENTOR(S) : Egon Josef Heeb, et al.

It is certified that error appears in the above-identified patent and that said Letters Patent is hereby corrected as shown below:

Column 13, line 46 (Claim 1), "sequential" should be deleted and "each of said" should be inserted in its place.

Column 13, line 49 (Claim 1), after "direction", insert -- by a constant amount and with the same sense --.

Signed and Sealed this

Seventeenth Day of February, 1987

Attest:

DONALD J. QUIGG

Attesting Officer

Commissioner of Patents and Trademarks